US010370179B2

(12) United States Patent
Schneuing

(10) Patent No.: US 10,370,179 B2
(45) Date of Patent: Aug. 6, 2019

(54) TRANSPORT BAG FOR TRANSPORTING A PRODUCT IN A HANGING GARMENT CONVEYOR

(71) Applicant: Vanderlande Industries B.V., Veghel (NL)

(72) Inventor: Ralf F. Schneuing, Bielefeld (DE)

(73) Assignee: Vanderlande Industries B.V., Veghel (NL)

( * ) Notice: Subject to any disclaimer, the term of this patent is extended or adjusted under 35 U.S.C. 154(b) by 235 days.

(21) Appl. No.: 14/959,181

(22) Filed: Dec. 4, 2015

(65) Prior Publication Data
US 2016/0159558 A1 Jun. 9, 2016

(30) Foreign Application Priority Data

Dec. 4, 2014 (DE) .................. 10 2014 224 872

(51) Int. Cl.
| | |
|---|---|
| *B65D 33/24* | (2006.01) |
| *B65D 85/18* | (2006.01) |
| *B65G 17/20* | (2006.01) |
| *B65G 47/38* | (2006.01) |
| *B65G 9/00* | (2006.01) |
| *B65D 30/00* | (2006.01) |
| *B65D 33/02* | (2006.01) |
| *B65D 33/14* | (2006.01) |

(52) U.S. Cl.
CPC ............ *B65D 85/18* (2013.01); *B65D 29/00* (2013.01); *B65D 33/02* (2013.01); *B65D 33/14* (2013.01); *B65D 85/185* (2013.01); *B65G 9/004* (2013.01); *B65G 17/20* (2013.01); *B65G 47/38* (2013.01)

(58) Field of Classification Search
CPC ........... A45C 5/00; A45C 11/02; A45C 13/03; A45C 3/004; A47G 25/54
USPC .......... 206/278, 282, 287, 292; 211/113, 118
See application file for complete search history.

(56) References Cited

U.S. PATENT DOCUMENTS

| | | | |
|---|---|---|---|
| 2,656,044 | A | 10/1953 | Doherty |
| 2,961,091 | A | 11/1960 | Enrich |

(Continued)

FOREIGN PATENT DOCUMENTS

| | | | | |
|---|---|---|---|---|
| DE | | 10354419 A1 * | 6/2005 | ........... B65G 19/025 |
| DE | 102004018569 A1 | | 11/2005 | |

(Continued)

*Primary Examiner* — Fenn C Mathew
*Assistant Examiner* — Cynthia F Collado
(74) *Attorney, Agent, or Firm* — Wolf, Greenfield & Sacks, P.C.

(57) ABSTRACT

A transport pocket for transporting an article in an overhead conveyor includes a suspension element by which the transport pocket can be suspended from the overhead conveyor, a pocket body having a front wall, a rear wall and a base therebetween, where the front wall has an opening, and a lever element by which the pocket body can be switched between at least two positions in which the front wall and the rear wall assume different relative vertical positions. In a first of the at least two positions, the opening is at a suitable distance from a deepest point of the pocket body for securely housing the article in the pocket body and, in a second of the at least two positions, the opening reaches the deepest point of the pocket body so that the article is able to slide out of the pocket body through the opening.

16 Claims, 2 Drawing Sheets

(56) References Cited

U.S. PATENT DOCUMENTS

| | | | | | |
|---|---|---|---|---|---|
| 4,688,671 | A | * | 8/1987 | Felsenthal | A47G 25/54 206/279 |
| 5,697,508 | A | * | 12/1997 | Rifkin | A47G 25/0692 206/286 |
| 6,308,837 | B1 | * | 10/2001 | Bragg | A47B 81/00 211/113 |
| 6,354,232 | B1 | * | 3/2002 | Hulke | A47B 43/003 108/149 |
| 7,954,639 | B2 | * | 6/2011 | Carney | A47B 43/003 206/579 |
| D679,121 | S | * | 4/2013 | Malone | D6/514 |
| 8,448,794 | B1 | * | 5/2013 | Wang | A47B 61/00 206/286 |
| 8,607,963 | B2 | * | 12/2013 | Wend | B65G 47/61 141/250 |
| D766,007 | S | * | 9/2016 | Wang | D6/514 |
| 9,630,751 | B1 | * | 4/2017 | Otto | B65G 17/20 |
| 2009/0206711 | A1 | * | 8/2009 | Glenn | A47B 43/003 312/108 |
| 2012/0152697 | A1 | * | 6/2012 | Janzen | B65G 17/32 198/680 |
| 2012/0216917 | A1 | * | 8/2012 | Janzen | B65G 19/025 141/166 |

FOREIGN PATENT DOCUMENTS

| | | |
|---|---|---|
| DE | 102010053590 A1 | 6/2012 |
| EP | 2130968 A1 | 12/2009 |
| EP | 2709935 A1 | 11/2012 |
| EP | 2708478 A1 | 3/2014 |
| WO | WO 2012/156451 | 11/2012 |

\* cited by examiner

TRANSPORT BAG FOR TRANSPORTING A PRODUCT IN A HANGING GARMENT CONVEYOR

CROSS-REFERENCE TO RELATED APPLICATIONS

This Application claims priority to German Application No. 10 2014 224 872.8, filed Dec. 4, 2014, entitled "TRANSPORT BAG FOR TRANSPORTING A PRODUCT IN A HANGING GARMENT CONVEYOR".

TECHNICAL FIELD

The present invention relates to a transport pocket for transporting an article in an overhead conveyor. It comprises a suspension element by means of which the transport pocket can be suspended from the overhead conveyor, a pocket body having a front wall, a rear wall and a base therebetween, wherein the front wall has an opening, and a lever element by way of which the pocket body is suspended from the suspension element and by means of which the pocket body can be switched between at least two positions in which the front wall and the rear wall assume different relative vertical positions with respect to one another.

PRIOR ART

Conventional overhead conveyors are used to convey hanging articles, which include in particular garments which can be conveyed hanging over a hanger. Such conveyors are fundamentally different from so-called flat conveyors, which convey not hanging garments or other objects, but objects which are lying on a base. However, there is a need also to be able to transport flat-packed articles using overhead conveyors, for example garments which cannot expediently be transported on a hanger, or accessories, but in principle also any other flat-packed articles, frequently, however, preferably small objects.

In order to make this possible, there are in the prior art many different proposals for transport pockets which can be suspended by way of a suspension element from an overhead conveyor and conveyed by the overhead conveyor. Articles which in principle cannot be conveyed in a hanging position can then be introduced into such transport pockets.

Such transport pockets are known, for example, from German patent application DE 103 54 419 A1. Transport pockets, in particular those known from DE 103 54 419 A1, are predominantly loaded and unloaded manually, which requires an outlay in terms of personnel corresponding to the conveying capacity of the conveyor.

For the increasing automation of the overhead conveyor system, it has long been required to be able to unload the transport pocket as automatically as possible. Some possible solutions are proposed in the prior art for this purpose too. For example, European patent application EP 2 709 935 A1 proposes partially detaching one side of the transport pocket from the transport pocket for unloading, so that the article situated in the transport pocket is able to fall out. A similar approach is also followed in European patent application EP 2 130 968 A1.

However, these systems for automatically unloading a transport pocket require relatively complicated devices and mechanisms for restoring the transport pocket so that it is suitable for transporting articles. If the transport pockets are not closed again manually, a high outlay in terms of apparatus is required, which is also accompanied by a high susceptibility to faults corresponding to its complexity.

DESCRIPTION OF THE INVENTION

Against the background of the known prior art, the object of the present invention is to provide a transport pocket for transporting an article in an overhead conveyor according to the above technical field, which transport pocket is so constructed that automatic emptying of the transport pocket is possible easily and reliably while at the same time a state in which the transport pocket is suitable for transporting the article can be restored without a high outlay in terms of apparatus.

The object is achieved by the transport pocket according to claim 1. Advantageous further developments of the invention will become apparent from the dependent claims.

The transport pocket according to the invention for transporting an article in an overhead conveyor comprises a suspension element by means of which the transport pocket can be suspended from the overhead conveyor, a pocket body having a front wall, a rear wall and a base therebetween, wherein the front wall has an opening, and a lever element by way of which the pocket body is suspended from the suspension element and by means of which the pocket body can be switched between at least two positions in which the front wall and the rear wall assume different relative vertical positions with respect to one another. The transport pocket according to the invention is characterized in that the opening is so positioned and configured that, in a first of the at least two positions of the pocket body, it is at a suitable distance from a deepest point of the pocket body for securely housing the article in the pocket body and, in a second of the at least two positions of the pocket body, it reaches the deepest point of the pocket body so that in the second position the article is able to slide or fall out of the pocket body through the opening by means of gravity.

The suspension element can in particular be a known hook, with which the transport pocket can be suspended from the overhead conveyor. The suspension element thereby takes the weight of the transport pocket together with the article situated therein, or at least a large part thereof. The suspension element can also be in multi-part form, preference being given to a simple hook for the sake of simplicity.

The pocket body having the front wall, the rear wall and the base situated therebetween can in particular be so configured that the front wall, the base and the rear wall merge continuously into one another and are part of a single, preferably flat, object. For example, the pocket body as a whole can be formed by a continuous textile sheet, film sheet or the like. It is, however, preferred that there are structural differences between the front wall and the base and also between the rear wall and the base, in particular as regards their stiffness and deformability as well as their strength. There can also be such differences between the front wall and the rear wall, in particular if the rear wall is subjected to a greater load than the front wall when the pocket body is used for transporting the article. The pocket body can of course also have further elements, in particular side walls, articulated joints or stabilizing elements, and can be not only in one-part but also in multi-part form. In one embodiment, in which the front wall is connected to the rear wall by an articulated joint, the articulated joint consequently forms the base of the pocket body.

It is possible that the front wall, the base and/or the rear wall are attached to the lever element by way of wires, ropes, cords, cables, struts or the like, so that the front wall and/or the rear wall do not have to extend as far as the lever element in order to fulfil the function of the pocket body for holding an article. Alternatively, the front wall and/or rear wall can have the mentioned wires, ropes, cords, cables, struts or the like at least in part, that is to say those elements can be regarded as part of the front wall and/or rear wall.

According to the invention, the opening in the front wall is suitable for allowing the article to be transported by the transport pocket to pass through. The opening is thus not only a viewing opening, which could be produced from transparent material or a net and does not allow the article to be transported to pass through, but an aperture of a sufficient size in the front wall, through which the article is able to pass out of the transport pocket or into the transport pocket. It is immaterial whether and what structures the front wall possesses apart from the opening.

A lever element is understood in the present context as being an element which is tiltable relative to the suspension element or which forms a lever arm. The lever element can also be in multi-part form. The lever element can be formed by a single strut, by a plurality of struts arranged side by side, or also by a plate, and all other technical forms of a lever element are also included in principle within the meaning of the present invention.

The pocket body is suspended from the suspension element by way of the lever element. In other words, the weight of the pocket body is transferred to the suspension element through the lever element. The lever element is situated between the suspension element and the pocket body in the force flow direction, which does not exclude the presence of further elements between the pocket body and the lever element or between the lever element and the suspension element.

The pocket body can be switched between at least two positions by means of the lever element. This means that the pocket body can be switched from at least a first position into at least a second position and also from the at least a second position back into the at least a first position again. Switching between two positions thus includes in particular a to-and-fro movement, not only a one-time change of the position of the pocket body. The front wall and the rear wall thereby assume different relative vertical positions with respect to one another, whereby the vertical positions of the front wall and of the rear wall are to be understood with the pocket body in a state in which it is suspended freely from the suspension element. In other words, a first point can be defined on the front wall, for example, which has the same vertical position as a second point, which is defined on the rear wall, in the first of the at least two positions. By switching the pocket body from the first position into the second position, the pocket body assumes a position in which the first point defined on the front wall no longer has the same vertical position as the second point defined on the rear wall but, for example, is disposed deeper. For example, the top edge of the front wall can be disposed above the top edge of the rear wall in the first position, while the top edge of the rear wall is disposed above the top edge of the front wall in the second position.

That the opening in the first position is at a suitable distance from a deepest point of the pocket body for securely housing the article in the pocket body means, in other words, that the article cannot fall out of the pocket body through the opening in that first position. The distance between the opening, more precisely the bottom edge of the opening, and the deepest point of the pocket body, more precisely the deepest point of the interior of the pocket body, that is to say of the portion in which the article is housed, thereby sets a limit for the maximum extent of the article which can be transported by the transport pocket.

The transport pocket can have different sizes according to the article to be transported, it always being possible to configure the opening, the pocket body itself and also the lever element in such a manner that the article can reliably be transported in the transport pocket and that same article can be unloaded automatically. This means that not every transport pocket is suitable for every article, but a transport pocket of a suitable size and configuration can be developed for any article which is conventionally to be transported by overhead conveyors.

The deepest point of the pocket body and the distance between the deepest point and the opening in the front wall are determined with the transport pocket in a state in which it is suspended freely from the suspension element. The shape of the pocket body, and thus also the distance between the deepest point and the opening in the front wall, can in principle readily be influenced by the article situated in the pocket body. It is therefore to be so chosen that it is sufficiently large for any article that is to be transported in the transport pocket, so that the article does not fall out of the pocket body through the opening when the pocket body is in the first position. Examples of a suitable distance are at least half the vertical extent of the article transported in the pocket body, that is to say in particular of the article for which the pocket body and thus the transport pocket is designed, preferably at least two thirds of the vertical extent of the article transported in the pocket body, more preferably at least the entire vertical extent of the article transported in the pocket body.

In the second position, the opening in the front wall reaches the deepest point of the pocket body, so that the article is then able to slide out of the pocket body through the opening by means of gravity. In other words, the opening is situated at the deepest point of the pocket body or at least very close thereto, so that the article situated in the pocket body reaches the opening and slides, slips or falls through the opening. In order to facilitate this, the pocket body can optionally also be provided with a coating or can have a shape which helps the article to slide through the opening.

By means of the transport pocket according to the invention it is possible to carry out automatic unloading of the transport pocket in an overhead conveyor, automatic restoration of the state in which the transport pocket is suitable for transporting the article also readily being possible, namely by switching the lever element from the second position back into the first position.

The transport pocket is preferably so configured that gravity pushes the pocket body into the first of the at least two positions and an additional force is required to switch the pocket body into the second of the at least two positions, in particular when an article is housed in the pocket body.

This means that, without external action, the pocket body is suspended from the lever element in such a manner that it is in the first position, in which the opening is at a distance from the deepest point of the pocket body and the article is housed securely in the pocket body. Without external action, the pocket body is thus suitable for transporting an article.

The pocket body is switched into the second position only by the action of an additional force from outside, for example by a curved guide or an actuating element located on the transport pocket. This preferred property of the transport pocket can be achieved, for example, by suitably choosing the weight distribution of the pocket body and/or the configuration, in particular length distribution, of the lever element. The outlay in terms of apparatus of the overhead conveyor as a whole can thus be reduced, because it is ensured that the article is housed securely in the pocket body over the entire conveying path of the conveyor without external action on the transport pocket, and the measures in terms of apparatus for switching the position of the pocket body for emptying must only be taken at the unloading station.

In a preferred embodiment, the lever element is so configured that a first axis, which is preferably oriented horizontally and about which the lever element is tiltable relative to the suspension element, is arranged closer to the front wall of the pocket body than to the rear wall of the pocket body. More precisely, that first axis is arranged closer to a front end of the front wall than to a rear end of the rear wall in a forwards-backwards direction. This configuration of the lever element has the effect that, without further means, the transport pocket is held in the first position by gravity. This is because, in this particularly preferred configuration of the lever element and of the pocket body attached thereto, the rear wall exerts a greater torque on the lever element than does the front wall, due to the lever principle, so that the lever element, in particular a frame, as will be described below, automatically assumes the first position, in which the opening is at a distance from the deepest point of the pocket body, without the action of an additional external force. Alternatively, a spring or the like can also be provided for correspondingly biasing the lever element and pushing it into its first position when the transport pocket is in the normal state.

In a preferred embodiment, the lever element is a frame by way of which the pocket body is suspended from the suspension element. Such a frame can be, for example, a wire frame, a metal frame of a different type, a wooden frame or a plastics frame. The frame can also be closed, that is to say can have the form of a plate, and can have many different shapes.

It is preferred that the pocket body is suspended from the suspension element by way of the frame in such a manner that the front wall, the rear wall, or the front wall and the rear wall are attached to the frame. This can be achieved by measures known from the prior art. Alternatively, however, the transport pocket can also be arranged on the frame by way of side walls which may be present or individual connecting struts.

In a preferred embodiment, the frame is tiltable relative to the suspension element about a first axis, which is preferably oriented horizontally. The frame can thereby be connected to the suspension element by way of an articulated joint, for example, so that tilting of the pocket body relative to the suspension element is possible. However, the frame can in principle also be in such a form that it is fixedly connected to the suspension element by way of a torsion spring, for example a wire that is resiliently deformable about its longitudinal axis, or the like, so that it is possible to switch between the two positions of the pocket body by overcoming the torsional force. Because the frame is tiltable about the first axis, the pocket body can be switched between the at least two positions, the above-described embodiment with an articulated joint being preferred over that with a torsion spring because an articulated joint ages and wears less quickly than a torsion spring.

In a preferred embodiment of the transport pocket, the frame has a rectangular outer contour with two long sides and two short sides, wherein the front wall and the rear wall of the pocket body are each attached to one of the long sides of the frame and wherein the frame additionally has a connecting member parallel to the long sides, at which the frame is operatively connected to the suspension element, wherein the first axis extends through the connecting member.

A rectangular outer contour means in this context not only a strictly mathematically correct rectangular shape, but also an outer contour with rounded corners or curved sides. It is, however, preferred that the two long sides are longer than the two short sides, in order to permit a front wall and rear wall that are as wide as possible, which contributes towards the suitability of the transport pocket for transporting relatively large articles. Long short sides, on the other hand, lead to a greater difference in the relative vertical positions of the front wall and the rear wall upon switching between the first position and the second position. The additional connecting member runs substantially parallel, that is to say taking relevant manufacturing tolerances into consideration, to the long sides. A slightly skew orientation of the connecting member relative to the long sides may not have any great effect on the functionality of the transport pocket and is therefore likewise to be included in principle. However, greater deviations from the parallelism between the additional strut and the long sides of the frame generally make it more difficult to operate the conveyor fully automatically. For a particularly precise transport pocket, therefore, it is desirable for the connecting member to be as parallel as possible.

An operative connection between the frame and the suspension element can be understood as being, for example, the articulated joint already mentioned above, by way of which the frame is suspended from the suspension element. By means of the articulated joint, the frame can successfully be tilted relative to the suspension element, the alternative of a torsional connection already mentioned above also coming into consideration.

A size of the opening in the front wall is advantageously greater than or equal to a size of the base, preferably the size of the opening is equal to the size of the base. The size of the opening and the size of the base is preferably also accompanied by an identical shape of the opening and of the base. In other words, it is particularly preferred that both the size and the shape of the opening and the base are identical. However, there may also be applications of the transport pocket according to the invention in which the size of the opening is to be greater than or equal to the size of the base only in one direction, for example transversely to the conveying direction or transversely to the lever element, while the size of the opening perpendicular thereto can also be smaller than the corresponding size of the base.

This allows an article resting on the base of the transport pocket to be discharged through the opening particularly reliably because the article cannot become caught on the edges of the opening and it immediately attracts attention already during the loading, if the article does not fit through the opening.

The base of the pocket body preferably has a greater stiffness than the front wall and the rear wall. This means that the base cannot be so readily deformed outside the direction of extension of the respective wall, in particular perpendicular thereto, as the front wall and the rear wall. This has the result that the transport pocket has clearly defined transitions between the front wall and the base and also between the rear wall and the base without further measures. Such transitions, and thus a clear division of the pocket body into front wall, base and rear wall, make the movement sequences in the pocket body upon switching of the lever element more readily predictable and less dependent on the article situated in the pocket body. This results in increased process reliability during operation of the conveyor. In particular, the base in this embodiment can be tilted parallel to the lever element and thus form a defined sloping plane by way of which the article is able to slide or fall out of the pocket body through the opening when the pocket body is in the second position. On the other hand, owing to the base provided with greater stiffness, the article can more reliably be prevented from accidentally falling out of the pocket body through the opening when the pocket body is in the first position.

In a further preferred embodiment, the base of the pocket body has at least a first base region having a first stiffness and a second base region having a second, greater stiffness. Particularly preferably, the first base region thereby tapers towards the front wall of the pocket body, in particular in a triangular shape.

Because the base has regions of different stiffnesses, a slide path of the article out of the pocket body through the opening can more easily be influenced and predicted. In particular, in the case where the less stiff base region tapers in a triangular shape towards the front wall, that is to say towards the opening, a similar effect as with a funnel can be achieved, since the article will tend to remain in the region of the less stiff base region because that region sags more and the article thus assumes an energetically more advantageous position.

The front wall and/or the rear wall and/or the base is advantageously made of a textile material or a film. All possible types of textile material and film are thereby to be included. Advantages of textile material or film in connection with the present invention are in particular that they are widely available inexpensively, which allows the transport pocket to be produced particularly inexpensively. Both individual parts of the pocket body separately, thus in particular the front wall, the rear wall or the base, or a plurality of parts together can be made of a special textile material or film. The strength in the direction of extension of the wall or the stiffness outside the direction of extension, in particular perpendicular thereto, of the individual sections of the pocket body can thereby also be varied by using different textile materials or films, different thicknesses of the same textile materials or films, or reinforcing elements.

Finally, it is preferred that there is formed between the lever element and the suspension element an articulated connection, by means of which the lever element is rotatable relative to the suspension element about a vertical second axis. The articulated joint for rotation of the lever element about the vertical second axis can be integral with an articulated joint for rotating/tilting the lever element about the horizontal first axis, but it can also be provided in addition thereto. Such an articulated connection can make it easier for the transport pocket manually to be loaded or moved in the conveyor. However, it is further preferred that the articulated connection for rotation of the lever element about the vertical second axis is selectively lockable. Unintentional rotation of the transport pocket about the vertical axis can thus be prevented.

Further features and advantages of the invention will become apparent from the following description of the figures and the totality of the patent claims.

WAYS OF CARRYING OUT THE INVENTION

Figure 1:
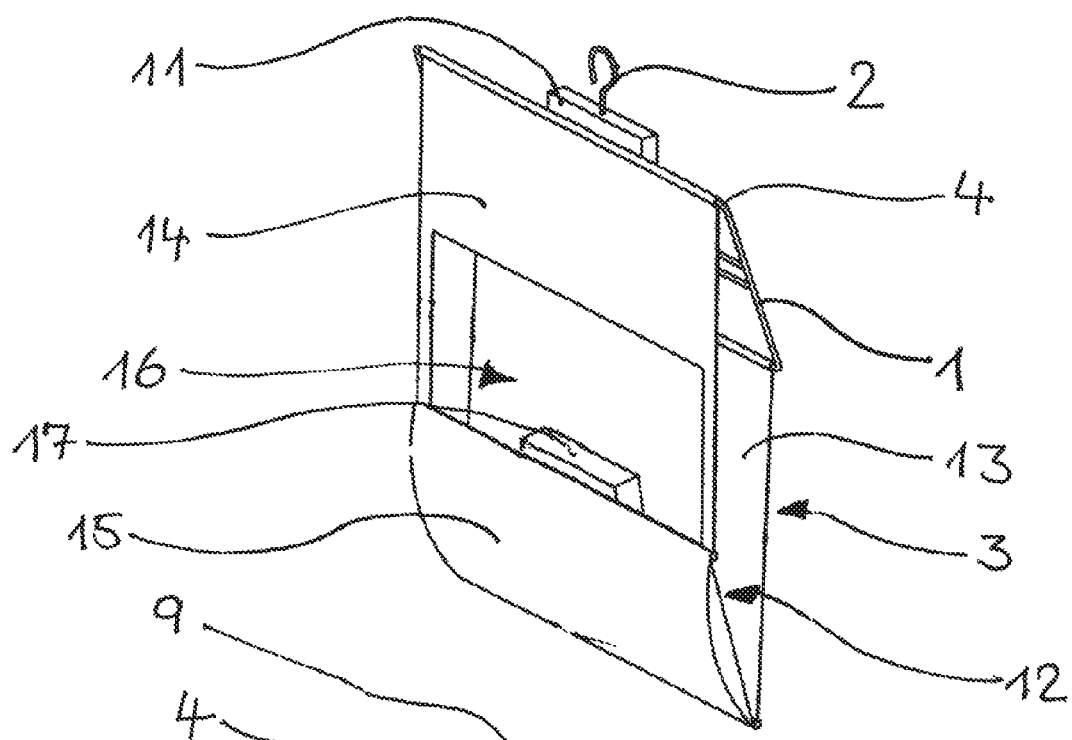
FIG. 1 is a perspective view of a preferred transport pocket in its first position.

The preferred transport pocket shown in the drawings has a frame 1, a suspension element 2 fixed to the frame 1, and a pocket body 3 suspended from the frame 1. The frame 1 comprises a peripheral wire frame 4, which is rectangular in shape. Between two short sides 5 and 6 there are arranged two connecting members 7 and 8. The first connecting member 7 is arranged parallel to and centrally between two long sides 9 and 10 of the wire frame 4. The second connecting member 8 is situated in the gap between the front second long side 10 and the connecting member 7. The second connecting member 8 is thus arranged closer to the front second long side 10 than to the rear first long side 9.

A carrying body 11 is pushed onto the connecting member 8. The carrying body 11 has a through-bore, which acts as a swivel joint for the connecting member 8. The suspension element 2, which in the embodiment shown is in the form of a hook, is arranged on the top side of the carrying body 11. By means of the suspension element 2, the transport pocket can be suspended from an overhead conveyor.

The conveyor serves to sort products such as garments, books or other objects of similar size and bring them into predetermined arrangements for despatch purposes, for example. Such conveyors generally have revolving chains or conveyor belts from which a plurality of suspension elements 2 can be suspended.

By arranging the carrying body 11 with the suspension element 2 asymmetrically relative to the centre of gravity of the transport pocket and in particular of the frame 1, the transport pocket according to the invention is in the first position shown in FIG. 1, which represents its transport position, as it moves along the conveyor.

A pocket body 3 is suspended from the frame 1. The pocket body 3 substantially has a rear wall 13, a front wall 14, and a base 15 connecting the front wall and the rear wall 13. An opening 16 is formed in the front wall 14. The pocket body 3 can optionally also have one or more side walls, which can extend upwards from the base 15 between the front wall 14 and the rear wall 13. The front wall 14 and the rear wall 13 have substantially the same length and are both attached to the frame 1 as an example of a lever element. A sloping position of the frame 1 is thereby transmitted to the pocket body, and the relative vertical position of the front wall 14 and the rear wall 13 with respect to one another can be changed by switching the frame 1 between two different tilted positions on the carrying body 11.

As can be seen in FIG. 1, the transport position of the transport pocket according to the invention is characterized in that a bottom edge of the opening 16 in the front wall 14 is at such a distance from a deepest point of the pocket body 3 that an article 17 can be housed securely in the pocket body 3. A transport space 12 in which the article 17 can be transported is thus formed.

Figure 2:
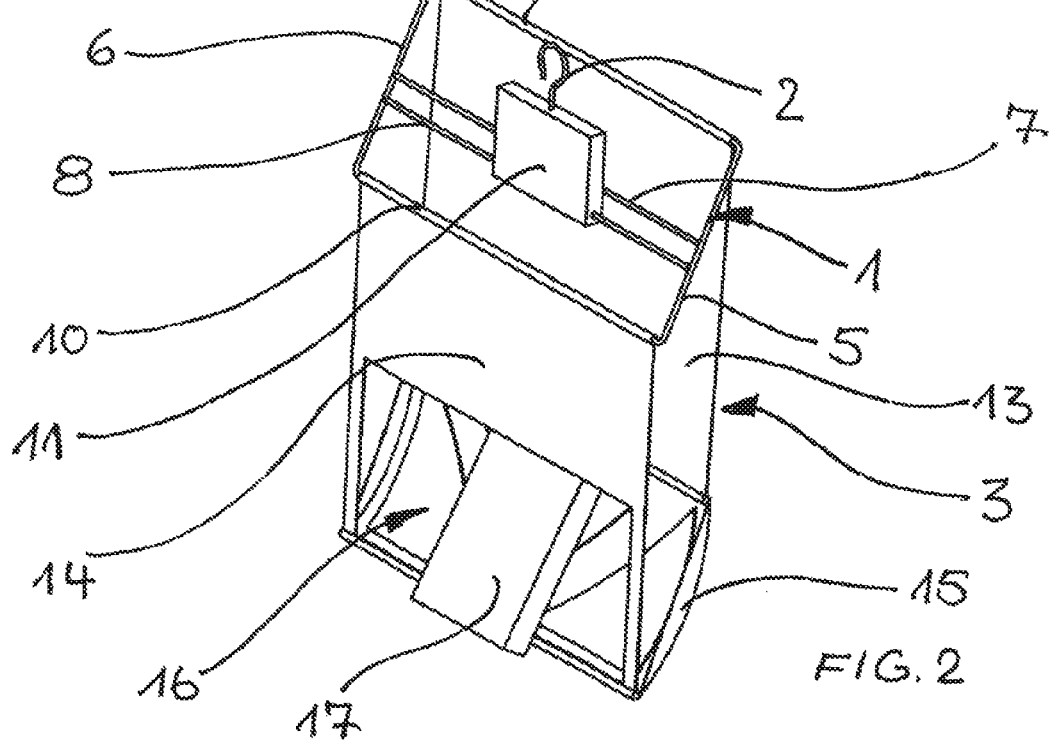
FIG. 2 shows the transport pocket of FIG. 1 in its second position.

When the transport pocket is moved to an unloading station, for example, the transport pocket can be brought by means of auxiliary means (not shown in the drawings) into the second position shown in FIG. 2, in which the transport pocket is in an emptying position. The auxiliary means can be, for example, a curved guide which tilts the frame 1 from the first position of FIG. 1 into a second position of FIG. 2. Alternatively, other auxiliary means which are able to switch the position of the frame 1 can be used, for example an actuating element with which the frame can be tilted.

The second position is characterized in that the frame is so oriented that the front second long side 10 is now in a lower position than the rear first long side 9. Tilting of the wire frame 4 at the same time causes the base 15 of the 12 pocket body 3 to be tilted. This has the result that a connecting edge between the base 15 and the front wall 14 is lowered, so that the article 17 is able to slide out of the pocket body 3 through the opening 16. This is because, in this position, the opening 16 reaches the deepest point of the pocket body 3 and the article 17 is not held in the region of the front wall 14 but slips out of the pocket body and is able to fall onto a conveyor belt or into a collecting container or the like which may be situated beneath the transport pocket.

Once the article 17 has left the transport pocket, the lowering of the front second long side 10 of the frame 1 can be removed and the pocket body 3 automatically returned to its first position shown in FIG. 1 again. The transport pocket can then again be loaded with an article 17 on its path along the revolving conveyor, without the transport pocket having to be returned to a transport position in a complex operation, as is necessary in the prior art, for example.

Figure 3:
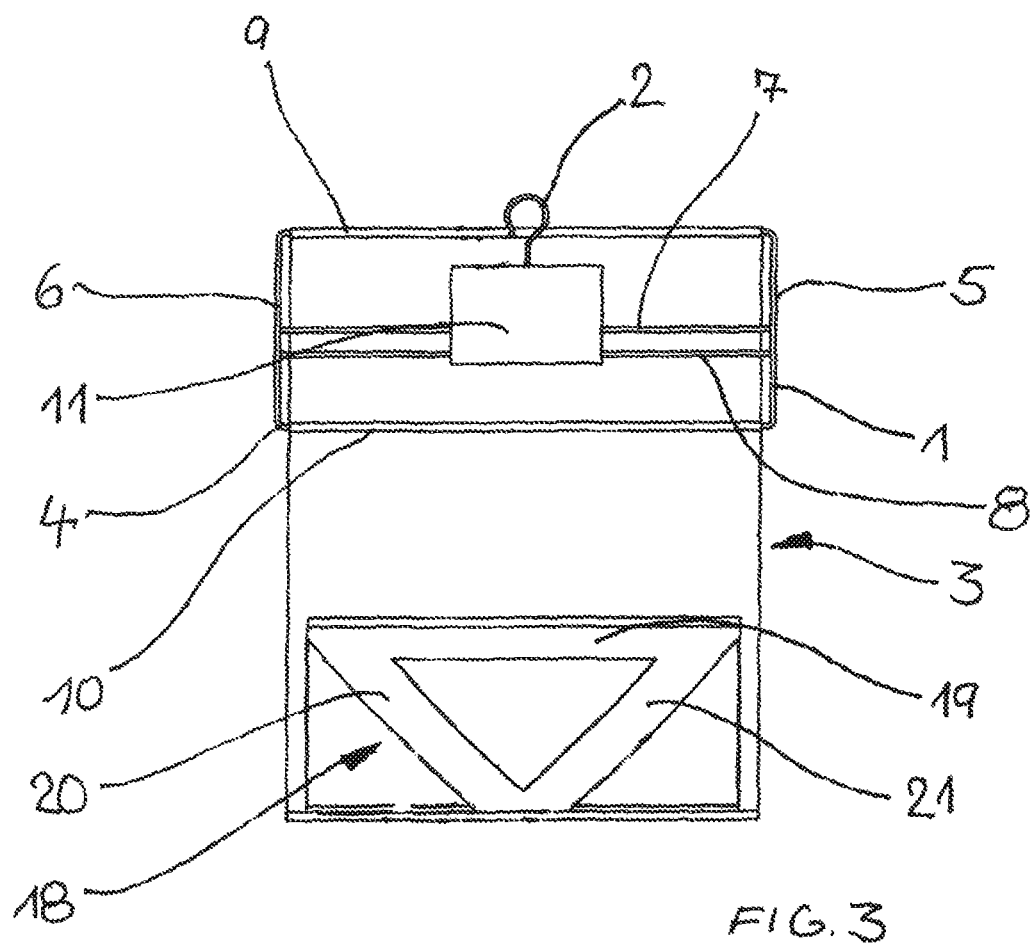
FIG. 3 shows a front view of the transport pocket of FIGS. 1 and 2 in its second position.

According to an advantageous further development of the invention, the article 17 can be assisted in falling out by providing the base 15 of the pocket body with at least two regions of different material stiffness, as shown in FIG. 3. The base thereby preferably has a triangular first region 18 of lower material stiffness, which has a transverse web 19 on a rear side of the base 15 facing the rear wall 13 and two folded webs 20 and 21 which come together, for example substantially at a right angle, and are connected to one another at a front side of the base 15 and are connected at their opposite end to the transverse web 19. Outside the first region 18, the base 15 has a second region of greater material stiffness than that of the first region 18. A region of greater material stiffness may optionally also be present inside the first region 18 of lower material stiffness, and it is also conceivable that the material stiffness of the base 15 is subdivided even further or changes continuously. Inherent material properties are suitable for this purpose on the one hand, and on the other hand the lower material stiffness can also be achieved by making the region thinner or by a mechanical influence, for example folding or the like.

Owing to the lower material stiffness of the transverse web 19 and of the folded webs 20 and 21, the base 15 is funnel-shaped in the second position of the pocket body 3, the middle base region facing the front wall 14 assuming the lowest position of the funnel. The article 17 situated in the pocket body 3, assisted by the particular funnel shape of the base 15, will thus fall centrally out of the pocket body 3 through the opening 16.

In particular in the case of a relatively high transport speed of the conveyor, the precision of emptying the transport pocket can be increased by the described measure.

Once the article 17 has fallen through the opening 16 into a collecting container (not shown) situated beneath the transport pocket or onto a conveyor belt or the like, the frame 1, as already described above, can return to its first position, so that a new article 17 can securely be housed and transported in the pocket body 3.

The invention claimed is:

1. A transport pocket for transporting an article in an overhead conveyor, comprising:
    a suspension element by which the transport pocket can be suspended from the overhead conveyor,
    a pocket body having a front wall, a rear wall and a base therebetween, wherein the front wall has an opening, and
    a lever element,
        by which the pocket body is suspended from the suspension element and
        by which the pocket body can be switched between at least two positions in which the front wall and the rear wall assume different relative vertical positions with respect to one another,
    wherein the opening has a lowermost portion that is adjacent to the base, and wherein when the opening is in a first of the at least two positions of the pocket body, the lowermost portion of the opening is above a deepest point of the pocket body for securely housing the article in the pocket body, and
    in a second of the at least two positions of the pocket body, the lowermost portion of the opening is positioned at the deepest point of the pocket body, so that in the second position the article is able to slide out of the pocket body through the opening by gravity.

2. The transport pocket as claimed in claim 1,
    wherein the transport pocket is so configured that gravity pushes the pocket body into the first of the at least two positions and an additional force is required to switch the pocket body into the second of the at least two positions.

3. The transport pocket as claimed in claim 1,
    wherein the lever element is tiltable relative to the suspension element about a first horizontally oriented axis, and
    wherein the first axis is preferably arranged closer to the front wall of the pocket body than to the rear wall of the pocket body.

4. The transport pocket as claimed in claim 3,
    wherein the lever element is a frame, wherein at least one of the front wall and rear wall is attached to the frame whereby the pocket body is suspended from the suspension element,
    wherein the frame is tiltable relative to the suspension element about the first axis, as a result of which the pocket body can be switched between the at least two positions.

5. The transport pocket as claimed in claim 4,
    wherein the frame has a rectangular outer contour with two long sides and two short sides,
    wherein the front wall and the rear wall of the pocket body are each attached to one of the long sides of the frame, and
    wherein the frame additionally has a connecting member parallel to the long sides, at which the frame is operatively connected to the suspension element,
    wherein the first axis extends through the connecting member.

6. The transport pocket as claimed in claim 1,
    wherein a size of the opening is greater than or equal to a size of the base.

7. The transport pocket as claimed in claim 1,
    wherein the base of the pocket body has a greater stiffness than the front wall and the rear wall.

8. The transport pocket as claimed in claim 1,
    wherein the base of the pocket body has at least a first base region having a first stiffness and a second base region having a second, greater stiffness, and wherein the first base region tapers towards the front wall of the pocket body in a triangular shape.

9. The transport pocket as claimed in claim 1,
wherein at least one of the front wall, the rear wall and the base is made of a textile material or a film.

10. The transport pocket as claimed in claim 1,
wherein there is formed between the lever element and the suspension element an articulated connection by which the lever element is rotatable about a vertical second axis relative to the suspension element.

11. A transport pocket for transporting an article in an overhead conveyor, comprising:
a suspension element by which the transport pocket can be suspended from the overhead conveyor,
a pocket body having a front wall, a rear wall and a base therebetween, wherein the front wall has an opening, and
a lever element,
by which the pocket body is suspended from the suspension element and
by which the pocket body can be switched between at least two positions in which the front wall and the rear wall each move in opposing directions relative to the suspension element to assume different relative vertical positions with respect to one another,
wherein the opening is so positioned and configured that in a first of the at least two positions of the pocket body, the opening is above a deepest point of the pocket body for securely housing the article in the pocket body, and
in a second of the at least two positions of the pocket body, the opening reaches the deepest point of the pocket body, so that in the second position the article is able to slide out of the pocket body through the opening by gravity.

12. The transport pocket as claimed in claim 11,
wherein the transport pocket is so configured that gravity pushes the pocket body into the first of the at least two positions and an additional force is required to switch the pocket body into the second of the at least two positions.

13. The transport pocket as claimed in claim 11,
wherein the lever element is tiltable relative to the suspension element about a first horizontally oriented axis, and
wherein the first axis is preferably arranged closer to the front wall of the pocket body than to the rear wall of the pocket body.

14. The transport pocket as claimed in claim 13,
wherein the lever element is a frame, wherein at least one of the front wall and rear wall is attached to the frame whereby the pocket body is suspended from the suspension element,
wherein the frame is tiltable relative to the suspension element about the first axis, as a result of which the pocket body can be switched between the at least two positions.

15. The transport pocket as claimed in claim 14,
wherein the frame has a rectangular outer contour with two long sides and two short sides,
wherein the front wall and the rear wall of the pocket body are each attached to one of the long sides of the frame, and
wherein the frame additionally has a connecting member parallel to the long sides, at which the frame is operatively connected to the suspension element,
wherein the first axis extends through the connecting member.

16. The transport pocket as claimed in claim 11,
wherein there is formed between the lever element and the suspension element an articulated connection by which the lever element is rotatable about a vertical second axis relative to the suspension element.

* * * * *